Figure 1:
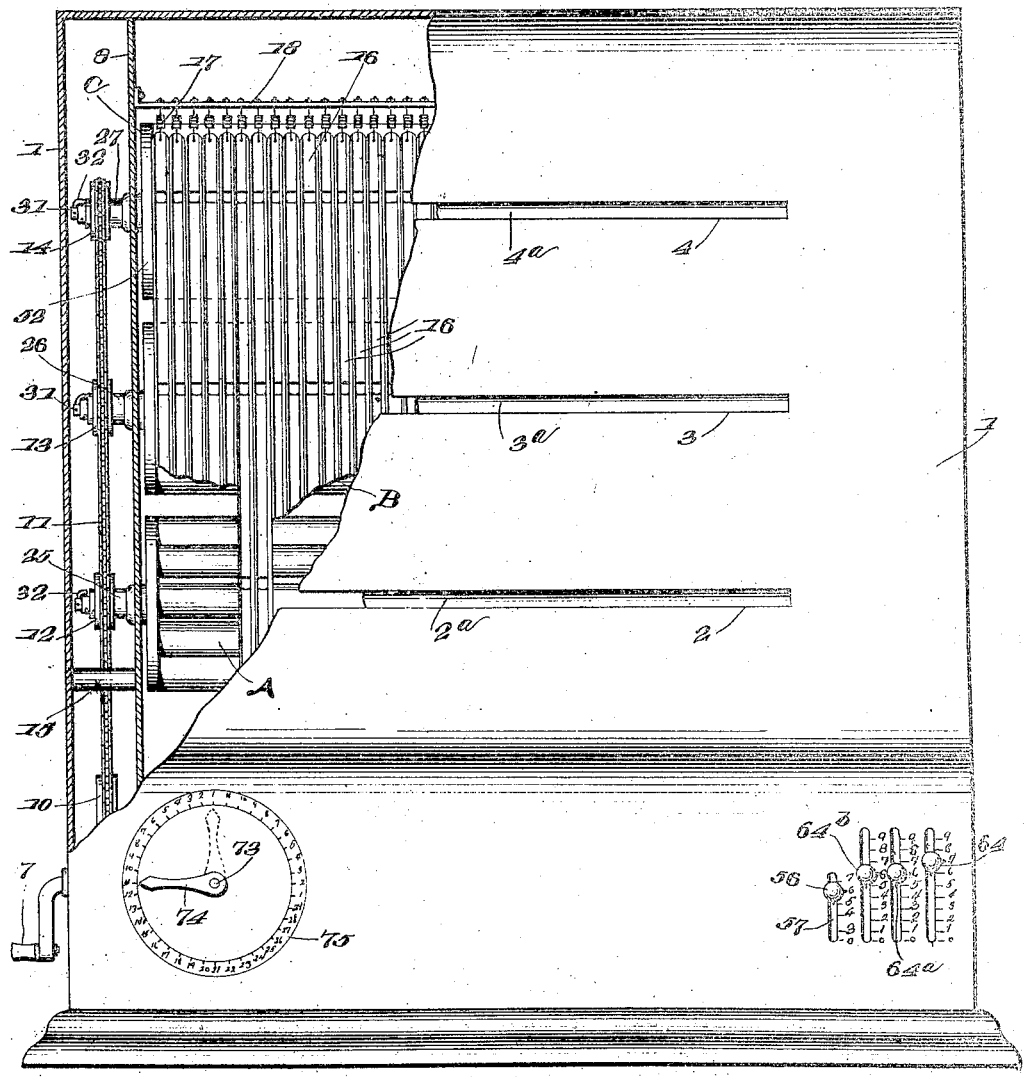

No. 819,667. PATENTED MAY 1, 1906.
C. A. MARBLE.
MACHINE FOR COMPUTING INTEREST.
APPLICATION FILED JAN. 4, 1905.

7 SHEETS—SHEET 1.

WITNESSES:

INVENTOR
Charles A. Marble
BY
ATTORNEYS

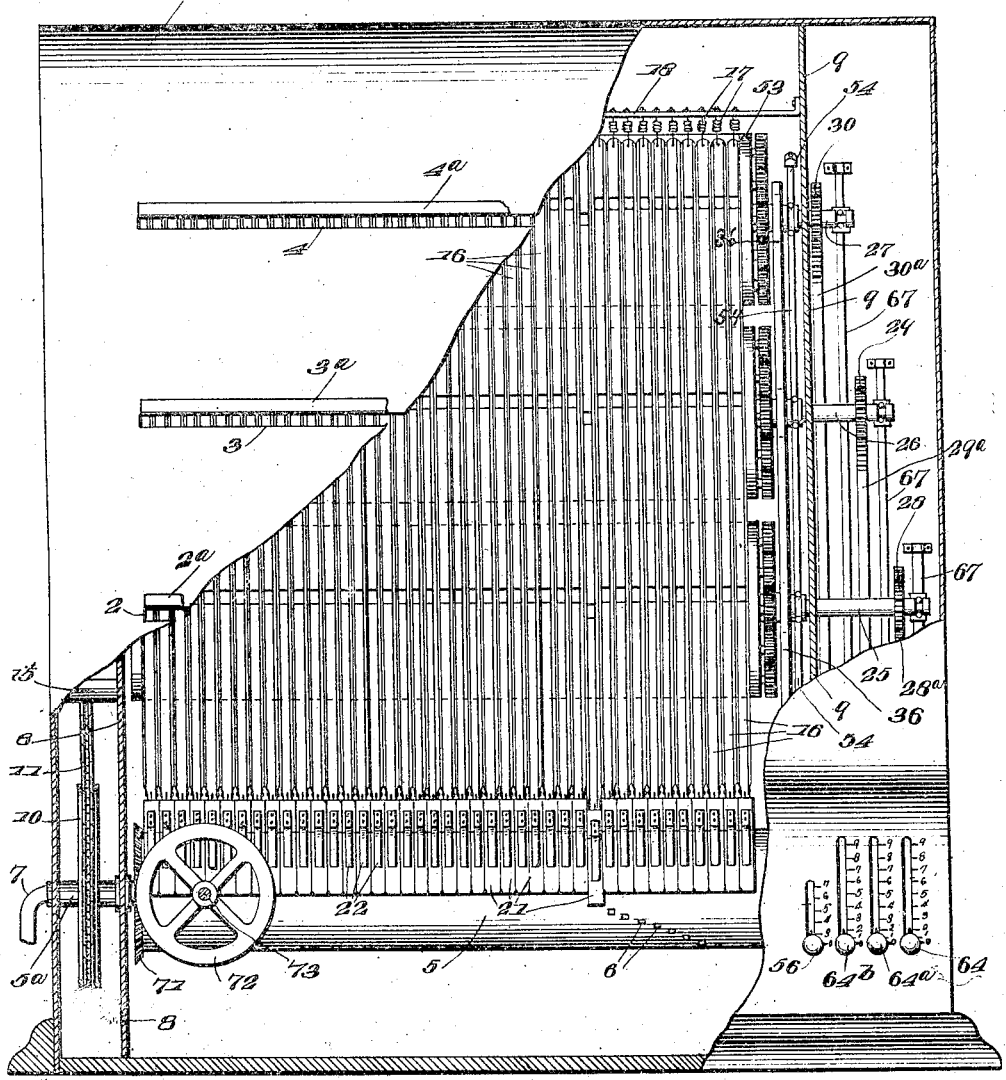
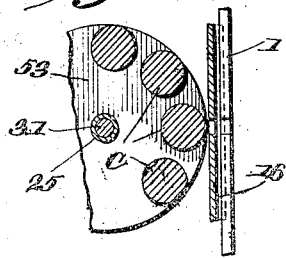

No. 819,667. PATENTED MAY 1, 1906.
C. A. MARBLE.
MACHINE FOR COMPUTING INTEREST.
APPLICATION FILED JAN. 4, 1905.
7 SHEETS—SHEET 3.
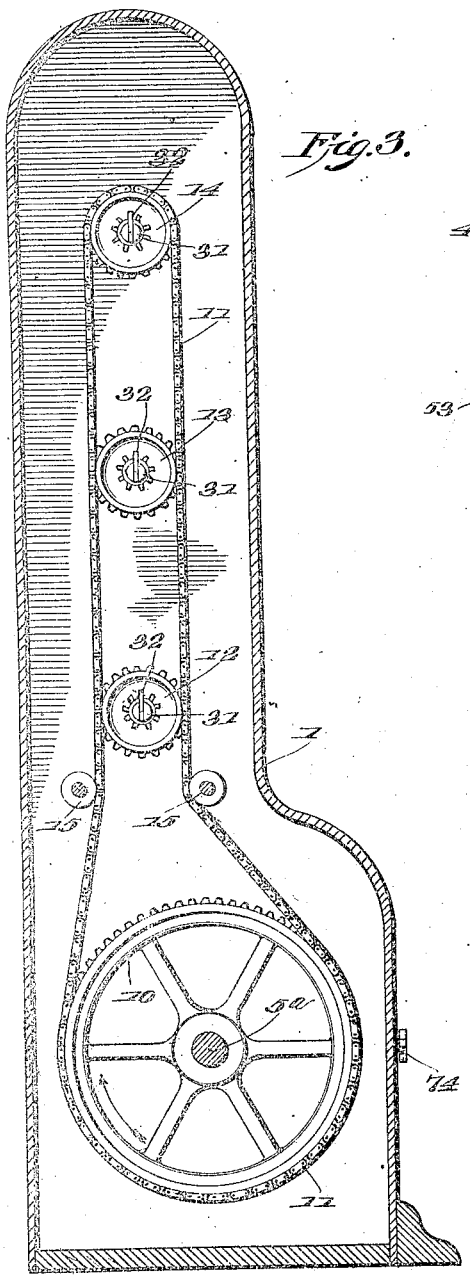
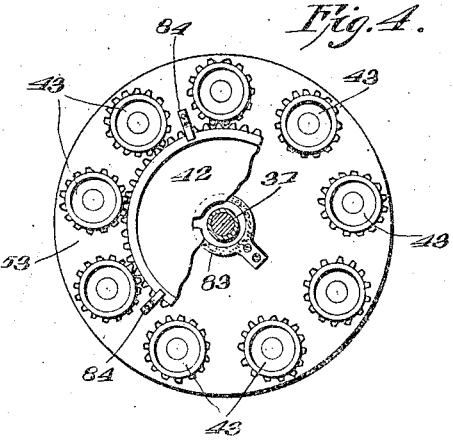
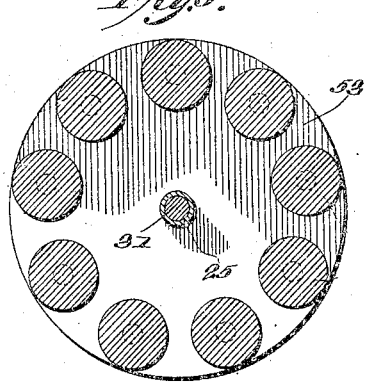
WITNESSES:
INVENTOR
Charles A. Marble.
BY
ATTORNEYS

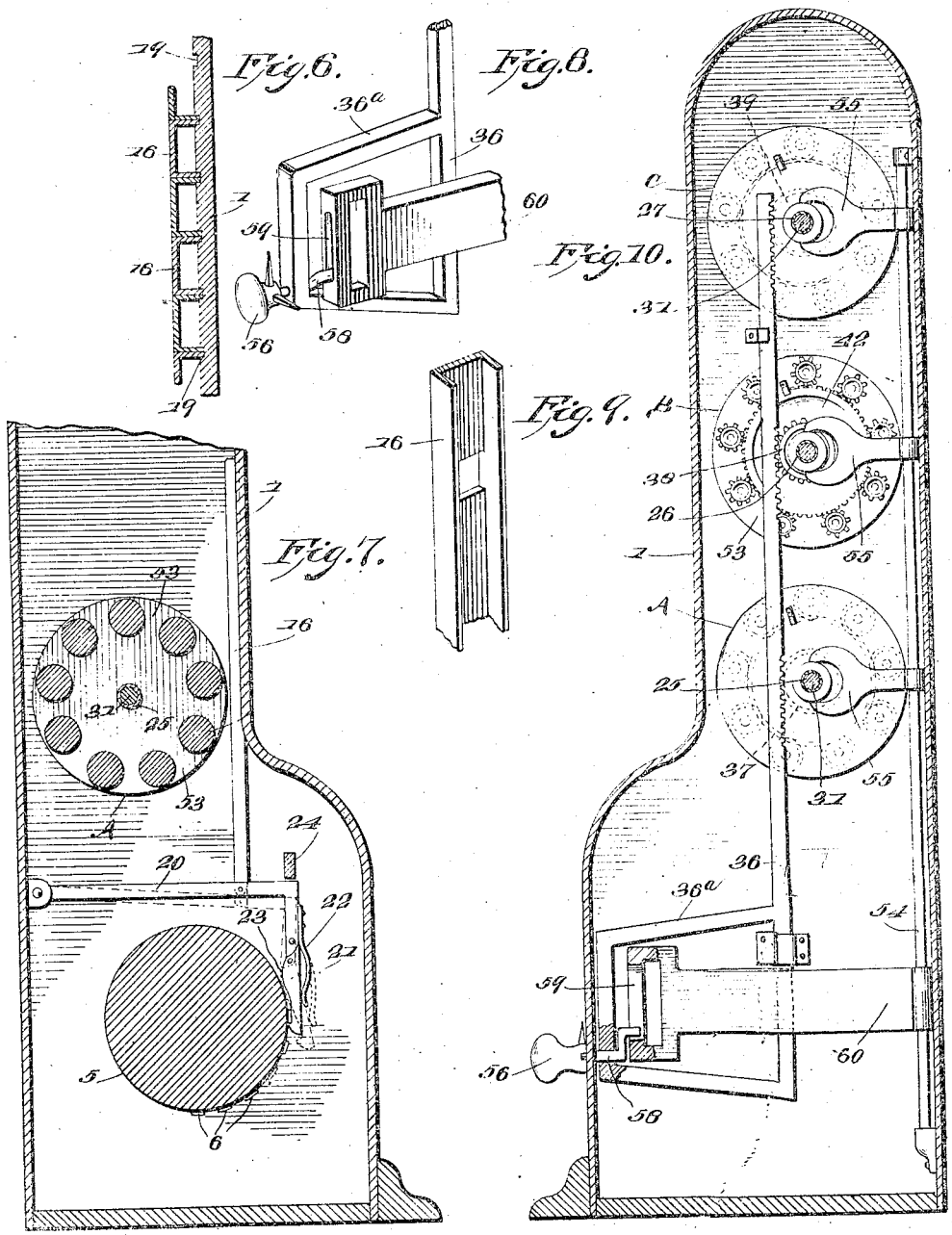

No. 819,667.   PATENTED MAY 1, 1906.
C. A. MARBLE.
MACHINE FOR COMPUTING INTEREST.
APPLICATION FILED JAN. 4, 1905.

7 SHEETS—SHEET 5.

WITNESSES:
INVENTOR
Charles A. Marble.
BY
ATTORNEYS

No. 819,667. PATENTED MAY 1, 1906.
C. A. MARBLE.
MACHINE FOR COMPUTING INTEREST.
APPLICATION FILED JAN. 4, 1905.
7 SHEETS—SHEET 6.
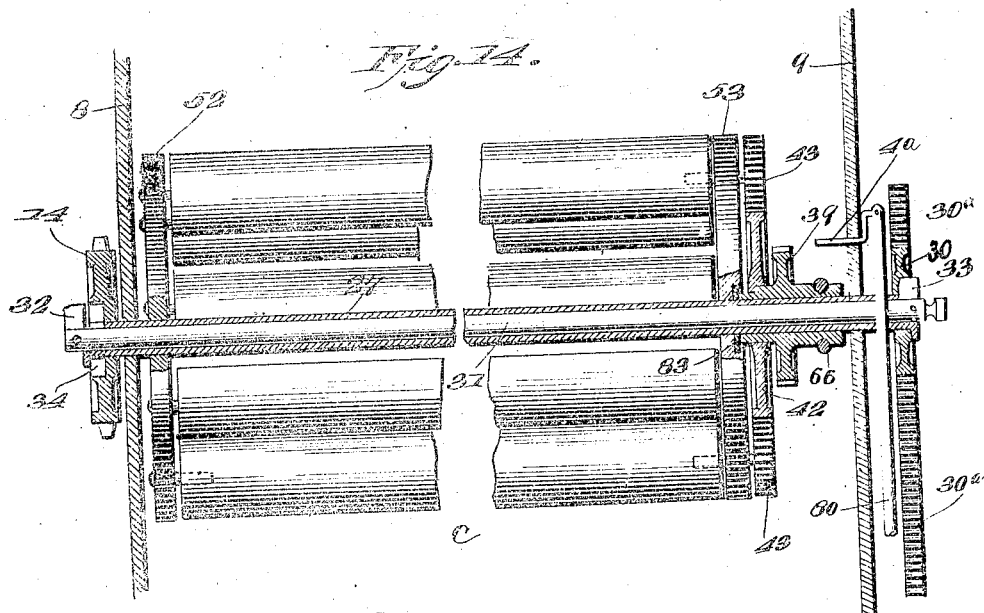
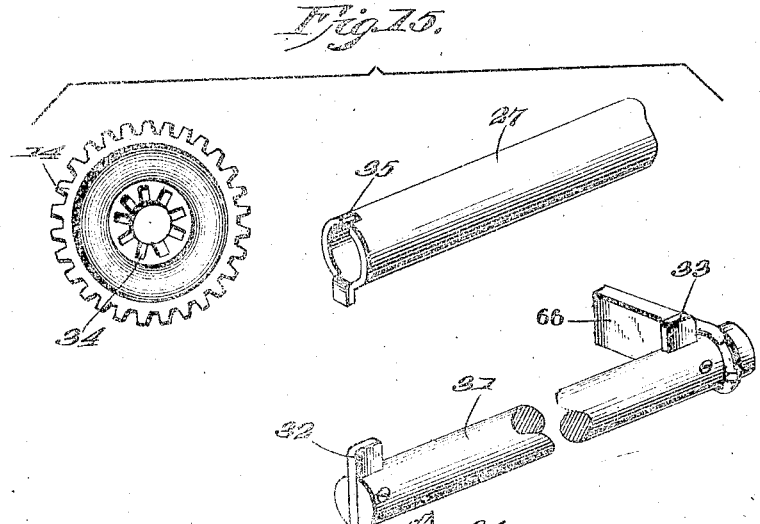
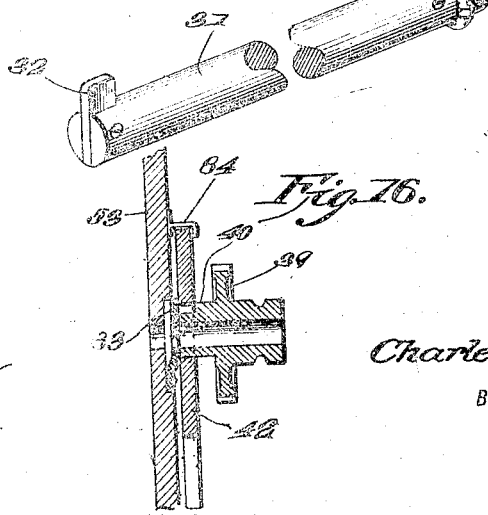
WITNESSES:
INVENTOR
Charles A. Marble
BY
ATTORNEYS No. 819,667.

PATENTED MAY 1, 1906.

C. A. MARBLE.
MACHINE FOR COMPUTING INTEREST.
APPLICATION FILED JAN. 4, 1905.

7 SHEETS—SHEET 7.

INVENTOR
Charles A. Marble.

WITNESSES

BY Munn & Co.

ATTORNEYS

UNITED STATES PATENT OFFICE.

CHARLES ABLE MARBLE, OF OTTUMWA, IOWA.

MACHINE FOR COMPUTING INTEREST.

No. 819,667.     Specification of Letters Patent.     Patented May 1, 1906.

Application filed January 4, 1905. Serial No. 239,560.

*To all whom it may concern:*

Be it known that I, CHARLES ABLE MARBLE, a citizen of the United States, residing at Ottumwa, in the county of Wapello and State of Iowa, have made certain new and useful Improvements in Machines for Computing Interest, of which the following is a specification.

My invention is an improvement in the class of automatic calculating-machines, more especially such as are particularly adapted for computing interest.

The objects I have had specially in view in devising and constructing the machine are comparative simplicity, great durability and facility, and absolute accuracy of operation.

A principal feature of my machine is a series of rotatable members, each comprising nine rollers, arranged parallel around a common axis and each inscribed on its periphery with numbers indicating different amounts of interest on a given sum for a given time. These several rollers have a planetary motion—that is to say, each is rotatable on its own axis and bodily around the common central axis. In view of the construction and arrangement of the aforesaid members they may be conveniently designated in description as "multiple-roller cylinders" or for still greater brevity "multiple cylinders." The means for rotating or adjusting, locking, and releasing these members or cylinders as a whole and their individual component rollers further embody special features of my invention.

The multiple cylinders are arranged parallel horizontally and in the same vertical plane. Another special feature is the provision of a series of apertured slides arranged vertically in front of the several multiple cylinders and serving to expose on the inscribed rollers in the required manner the several amounts of interest that are sought in any special computation. These slides are operated—*i. e.*, pulled down—to expose numbers indicating amounts of interest by means of a rotatable roller or cylinder having teeth adapted for detachable engagement successively with the said slides. The toothed cylinder is conveniently rotated by a hand-crank, and this is the sole manual manipulation required to obtain the interest amount or amounts sought, save the preliminary setting or adjusting of certain devices which are in the nature of sliding indicators relating to rate or per cent. of interest and the amount or sum upon which such interest is to be computed.

My invention also includes other features or mechanism involving novelty and which are important in connection with those above referred to.

The construction, arrangement, and operation of parts are as hereinafter described, reference being had to the accompanying drawings, in which—

Figure 11:
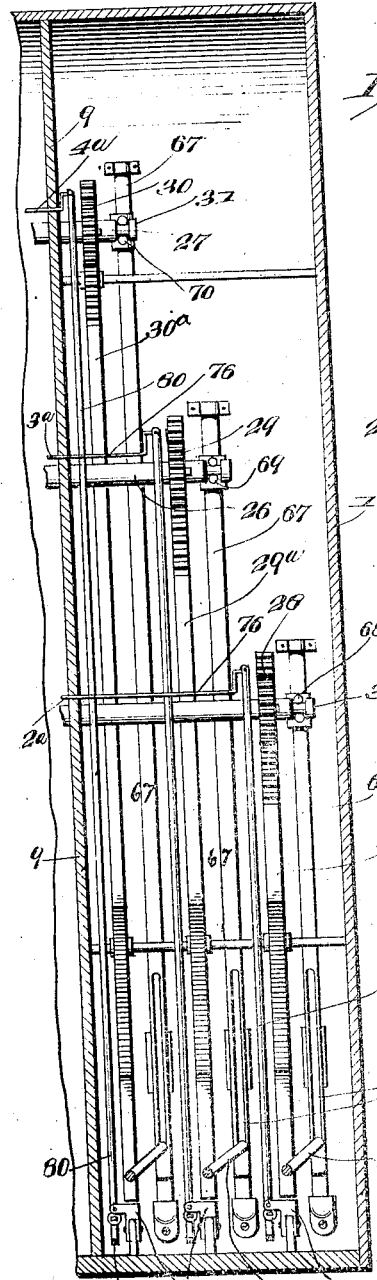
Figure 13:
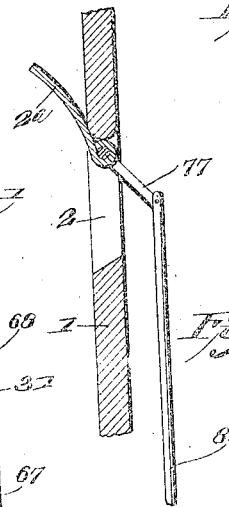
Figure 12:
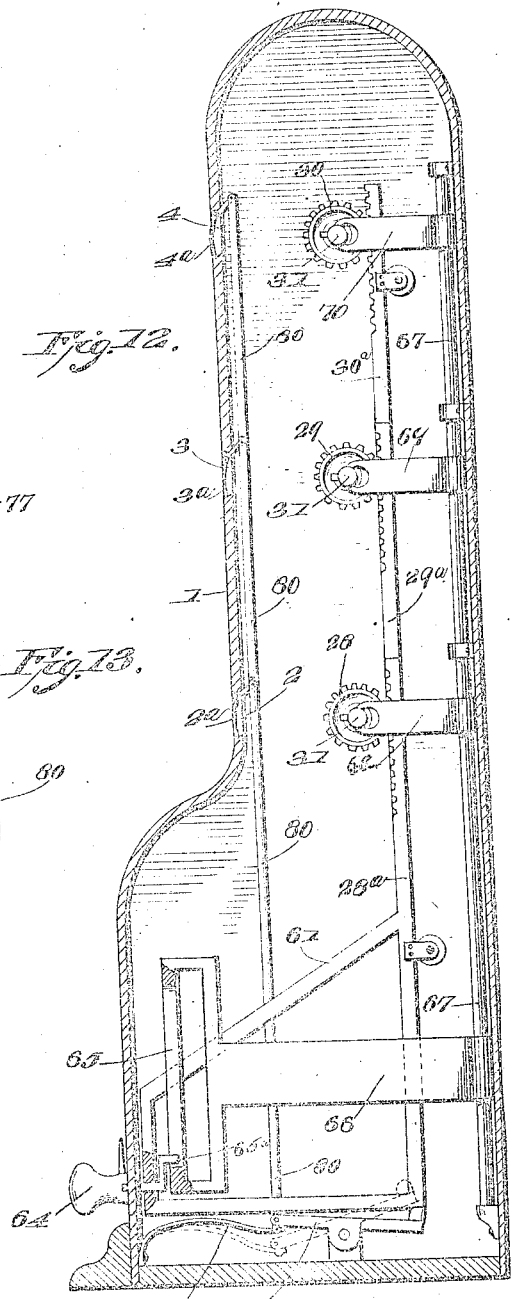

Figure 1 is a front elevation of my computing-machine, a portion of the casing being broken away to show the interior construction and arrangement of certain parts. Fig. 2 is in part a front elevation, the casing being broken away to further illustrate the interior construction. Fig. 3 is a vertical transverse section of the machine, the line of section being near the left-hand end of the casing. Fig. 4 is an end view of one of the multiple-roller cylinders, a portion of the master-gear which engages and rotates the several rollers being partly broken away. Fig. 5 is a cross-section of one of the multiple-roller cylinders. Fig. 6 is a transverse section of a portion of the front of the casing of the machine, showing the arrangement of the vertical apertured slides with relation to said casing. Fig. 7 is a vertical cross-section of the lower portion of the machine. Fig. 8 is a perspective view of the lower portion of the rack, which is connected with the interest-indicator on the front of the machine and serves to adjust all the rollers of the several cylinders to indicate interest or per cent. Fig. 9 is a perspective view of a portion of one of the apertured slides. Fig. 10 is a vertical cross-section of the machine, showing the interest-rack connected with the gears, which serve to rotate the several rollers of the cylinders for indicating interest. Fig. 11 is a vertical section of the right-hand portion of the machine, showing the connection and arrangement of parts whereby the rollers of the multiple cylinders are adjusted for indicating interest and principal. Fig. 12 is a vertical transverse section of the machine, taken near the right-hand end of the casing and illustrating the arrangement of the racks for adjusting or rotating the multiple-roller cylinders to indicate the principal upon which interest is to be computed and also illustrating the means for adjusting the racks vertically. Fig. 13 is a detail vertical section of a portion of the front of the casing, showing one of the covers or shutters of the slots in the casing raised as required to permit inspection of numbers on the rollers of the several cylinders. Fig. 14 is a longitudinal section of one of the multiple-roller cylinders, together with parts connected therewith, for rotating and locking the cylinder as a whole and the several rollers thereof individually. Fig. 15 is a view showing in detail the parts which coact for locking a sprocket-wheel with one of the multiple-roller cylinders. Fig. 16 is a detail section illustrating the arrangement of a spring in connection with one of the multiple-roller cylinders and the master-gear by which the several rollers of such cylinders are rotated. Fig. 17 is a diagrammatic view showing in plan the entire faces or circumferences of the nine rollers forming a multiple-roller cylinder, the rates of interest of different amounts or per cents. being indicated on the rollers. Fig. 18, Sheet 2, is a sectional view illustrating the position or local relation of a roller of a multiple cylinder and an apertured slide with reference to a slot in the casing when a number indicating interest can be read on the roller.

Referring in the first instance to Figs. 1, 2, and 3, 1 indicates a casing which incloses most of the operative parts, the same being preferably constructed of sheet metal. Its front side is provided with a series of parallel slots 2, 3, and 4, (see Fig. 1,) which are spaced apart equidistantly and extend the same length as the multiple-roller cylinders, which are directly beyond them. It will be seen that each multiple-roller cylinder is so arranged that its axis is in the same horizontal plane with one of the aforesaid slots. In the lower portion or enlarged base of the casing 1 is arranged the horizontal roller 5, (see Fig. 2,) having a series of teeth 6 arranged spirally thereon and provided with a crank 7, which is accessible at the left-hand end of the casing. The bearings of this roller are arranged in two vertical standards or plates 8 and 9, (see Figs. 1 and 2,) which are located a short distance from the respective ends of the casing.

As shown best in Fig. 3, a large sprocket-wheel 10 is mounted on the shaft 5ª of the roller 5, and a chain 11 runs thereon and also engages sprocket-wheels 12, 13, and 14, which are mounted loose on the shafts of the respective multiple-roller cylinders, means being provided for locking them therewith when it is required to rotate the said cylinders as a whole. The chain 11 runs on opposite sides of the sprocket-wheels 12, 13, and 14, as shown, idlers 15 being arranged in due position to guide the chain, as will be understood by reference to Fig. 3. For convenience of designation the multiple-roller cylinders will be designated by A, B, and C, the lower one, A, being opposite the slot 2 in the casing 1, the cylinder B opposite the slot 3, and the cylinder C opposite the slot 4. As indicated, these cylinders are arranged in vertical alinement and suitably journaled in the aforesaid standards or plates 8 and 9. Between the cylinders and the slotted front of the casing are arranged forty-one slides 16, the same being channeled longitudinally, as indicated in Figs. 6 and 9, and provided with three openings or apertures through which, when the slides are properly adjusted, may be seen certain figures or numbers on the rollers of the cylinders A, B, and C. These slides are constructed of metal, preferably sheet metal, struck up in the required form, and are arranged vertically side by side and supported by a series of spiral springs 17, (see Figs. 1 and 2,) which are suitably attached to a cross-bar 18, arranged in the upper portion of the casing 1. The parallel side flanges or edges of the several slides fit in grooves 19, formed in the front of the casing 1 on the inner side of the same, as shown. These grooves may be formed in the operation of striking up the front of the cylinder, if it be constructed of sheet metal, or in the process of casting the same, if the casing be constructed of thin cast metal, or they may be formed in any other manner so long as the main purpose is kept in view—namely, to provide vertical fixed guides for the slides, so that they will operate properly and be held steady in place.

As shown in Figs. 2 and 7, each of the aforesaid slides 16 is pivotally connected with an angular lever 20, which is pivoted to the rear side of the casing 1 and extends horizontally toward the front thereof. To the pendent free end of said lever is pivoted a catch 21, the same being adapted to engage one of the teeth 6 on the rotatable cylinder 5. A spring 22 serves to press the catch 21 inward, so that it is always in position for such engagement and is at the same time adapted to yield outward or away from the cylinder, so that the latter may be rotated backward without interfering with the catch. The inner side of the catch is provided with a swell or rounded projection 23, which comes in contact with the periphery of the cylinder 5 when the catch is drawn down, and thus aids in freeing the shoulder of the catch from the tooth it had engaged. The springs 17, connected with the upper ends of the slides 16, serve to hold the levers 20 normally in horizontal position or with their outer ends in contact with a horizontal stop-bar 24. The details of operation of these parts will be further referred to hereinafter.

As before intimated, the sprocket-wheels 12, 13, and 14 are mounted loose on hollow shafts 25, 26, and 27 of the respective multiple cylinders A, B, and C, and on the opposite or right-hand ends of said shafts are also mounted loose spur-gears 28, 29, and 30. (See Fig. 2.) As shown in the latter and also in Fig. 11, the several shafts extend to the right from the vertical standard 9, in which they are journaled—that is to say, the lower shaft 25 projects farthest, the shaft 26 a less distance, and the shaft 27 the shortest distance. This is for the purpose of allowing due space for connection of the several shafts with the means for adjusting them as required to rotate the multiple cylinders as a whole for setting them to accord with the numbers indicating the principal upon which interest is to be computed. The several gears 28, 29, and 30 and the sprocket-wheels 12, 13, and 14 on left side of machine (see Figs. 1 and 3) are locked by means of a rod 31. (See especially Figs. 14 and 15.) This rod is provided at its respective ends with lugs 32 33, the former being adapted to engage one of the sprocket-wheels and also the end of the adjacent hollow shaft, while the opposite lug 33 is adapted to engage one of the spur-gears 28, 29, and 30. As indicated in Figs. 14 and 15, the several sprocket-wheels 12, 13, and 14 are provided with notches 34 around the central openings therein, and the hollow shafts 25, 26, and 27 are provided with a notch 35, which the lug 32 is adapted to enter. Thus when the locking-rod 31 is adjusted to the left, as shown in Fig. 14, the lug 33 enters a notch in the adjacent gear 30 and locks it, while the opposite lug 32 is free from the sprocket-wheel on the opposite end of the hollow shaft 27. On the other hand, if the said rod 31 be shifted to the right the lug 33 will be disengaged from the gear, which will then be left free to rotate on the hollow shaft, while the lug 32 will enter the notches 34 of the sprocket-wheel and the notch 35 in the hollow shaft, and thus such sprocket-wheel will be locked with the shaft.

Since the multiple cylinders A, B, and C are each fast on their respective hollow shafts 25, 26, and 27, it is apparent that they will all be rotated bodily when the rod 31 is locked with the sprocket-wheels 12, 13, and 14, as above described, and, contrariwise, when the locking-rods 31 are disengaged from the sprockets 12, 13, and 14 the multiple cylinders may be rotated without affecting the sprocket-wheels or the cylinder 5, with which they are operatively connected through the medium of the chain 11. The several spur-gears 28, 29, and 30 engage vertical racks 28ª, 29ª, and 30ª, (see Figs. 2 and 11,) and by vertical adjustment of these racks the multiple cylinders are rotated bodily for setting them to indicate the amount of principal upon which the interest is to be computed, as will be further described.

As indicated in Fig. 10, a rack-bar 36 engages a series of spur-gears 37, 38, and 39, which are mounted loose and also slidable on the hollow shafts of the respective multiple cylinders A, B, and C. As shown in Figs. 14 and 16, the hubs of the spur-gears 37 39 are provided with a radial lug 40, which is adapted to enter a corresponding notch 41, formed in a large spur-gear 42, which for convenience of description will be hereinafter termed the "master-gear," since it meshes with a series of concentrically-arranged pinions or small spur-gears 43. (See Fig. 4.) These several pinions or small spur-gears are mounted fast on the shafts or journals of the nine rollers which constitute the main portion of each of the multiple cylinders A, B, and C. The said rollers are journaled so as to rotate free in circular hubs or disks 52 53, and the gears 43–51 are arranged exterior to the right-hand disk 53. The said disks are mounted fast on the hollow shafts 25, 26, and 27, so as to rotate therewith when the said shafts are duly locked, as before intimated. The several gears 37, 38, and 39 are slid, and thereby shifted on the hollow shafts of the multiple cylinders for bringing their hubs into and out of engagement with the several master-gears 42 as required in the operation of the machine hereinafter described. For the purpose of thus shifting these gears I employ (see Fig. 10) a vertical rock shaft or rod 54, having lever-arms 55, the shaft being journaled on the back of the casing 1 and extending nearly the height of the latter. The free ends of the lever-arms 55 are forked to adapt them for loose engagement with the hubs of the gears 37, 38, and 39, the hubs having a circumferential groove for this purpose. It will be observed in Fig. 10, also in Fig. 12, that all the racks are held in due engagement with the respective gears by means of brackets or rollers which work in connection with the backs of the rack.

In view of their functions I will hereinafter term the rack 36 the "interest-rack," since it is used solely for adjusting the multiple cylinders or, rather, the individual rollers thereof, as required to indicate some particular rate of interest or percentage, and I will term the other racks 26ª, 29ª, and 30ª as "amount-racks" or "principal-racks," since their sole purpose is to adjust the multiple cylinders as required to indicate the amount or principal upon which interest is to be computed.

Since in the present machine but three multiple cylinders A, B, and C are illustrated, it is obvious that three amount-racks are employed, and they, as shown in Figs. 2 and 11, are duly spaced apart, and each of them is provided on the face of the casing 1 with knobs by which they are duly adjusted. The interest-rack 36 is also provided with a knob which is located at the left of the amount-knobs. (See Fig. 1.) As shown in Fig. 10, the interest-knob 56 is journaled in a forwardly-projecting arm 36ª, forming a fixed attachment of the rack 36. Since the knob may be adjusted vertically in the slot 57, so that it may be placed opposite numbers "3" to "7," indicating rate of interest or percentage, it is apparent that the rack 36 will be similarly adjusted along with the knob, and thereby all the several spur-gears 37, 38, and 39 of the respective multiple cylinders A, B, and C will be rotated correspondingly. Thus if the knob 56 be adjusted so that it is opposite the number "6" on the adjacent scale the rack 36 will rotate the gears 37–39, and through the connections established the several rollers of each multiple cylinder will be rotated to bring the required interest-number to the front. The journal or shaft 58 of the interest-knob 56 is formed as a crank, Fig. 8, its free end entering a slot 59, formed in a horizontal lever-arm 60, that is fast on the vertical rock-shaft 54. It is apparent that by rotating the interest-knob 56 the lever-arm 60 will be shifted to the right or left and that through its medium the rock-shaft 54, its arms 55, and the several gears 37, 38, and 39 will be shifted right or left.

As illustrated in Fig. 12, practically the same construction, arrangement, and combination of parts are employed for adjusting the amount-racks 28ª, 29ª, and 30ª that engage the gears 28, 29, and 30, before referred to. Thus the lower end of each amount-rack is provided with a lateral extension or arm 61, and a knob is journaled in such arm, whose crank 65ª enters a slot 65, formed in the free end of a lever-arm 66, mounted fast on a vertical rock-shaft 67, the same being provided with lever-arms 68, 69, and 70, that engage the several locking-rods 31 of the several cylinders A, B, and C. Thus by adjusting an amount-knob 64 higher or lower it may be set opposite any number on the adjacent scale on the front of the casing 1, and by rotating said knob the lever-arm 66 may be thrown right or left and the vertical shaft 67 thereby rotated, so that its arms 68, 69, and 70 shift the several locking-rods 31 correspondingly. There are three rock-shafts 67, one for each amount-rack, all arranged alike.

As shown in Fig. 1, the knob on the right is indicated by the numeral 64, the next knob by 64ª, and the third knob by 64ᵇ. The numbers adjacent to the knob 64 indicate dollars from ten to ninety, inclusive, and the slot is therefore designated as the "tens" or "ten-dollar" slot. The next slot is designated as the "one-hundred-dollar" slot, since the numbers "1" to "9" adjacent thereto indicate hundreds of dollars. Similarly the third slot is termed the "one-thousand-dollar slot," since the numbers adjacent indicate thousands. It will be observed that the several interest and amount knobs are provided with pointers or projections which are located ninety degrees apart. They serve to indicate the position to which the knob has been rotated, and thereby the position of the lever-arms with which they are connected, so that the operator may know what position it occupied by the several shiftable gears within the casing.

Fig. 17 exhibits the peripheries of the nine rollers composing one of the multiple cylinders—viz., B. As will be seen, one of the rollers is appropriated for indicating the first day's interest on one hundred dollars, and the next roller for indicating the first day's interest on two hundred dollars, the next on three hundred dollars, and so on up to nine hundred dollars. Each of the rollers is divided into five spaces longitudinally and into forty-one spaces transversely, the forty-one spaces corresponding to the forty-one slides 16 before described. Thus on the first roller there will be indicated in the right-hand column the interest on one hundred dollars for one day at different rates of interest, ranging from three to seven per cent. In order that the spaces for the days and months may be readily observed or understood and also the amounts which the several rollers are used to indicate, numerals "1" to "29" have been applied along the top edge of Fig. 17 to indicate days and the numerals "1" to "12" to indicate months, while the sums "$100" to "$900" are applied on the left of the figure. Numbers have been applied to the several rollers sufficiently to indicate the scheme, and it is not necessary that all of the amounts of interest shall be indicated.

As shown in Fig. 2, a bevel-gear 71 is mounted on the shaft of the rotatable toothed cylinder 5 and engages or meshes with a corresponding gear 72, which is arranged at right angles to it and mounted fast on a horizontal shaft 73, that projects through the front of the casing (see Fig. 1) and carries a pointer or index 74. It is obvious that by rotation of the roller by means of the crank 7 to the left or forward as indicated by arrows, Fig. 3, the index or pointer 74 will be caused to rotate over the dial 75, whose periphery is inscribed with numbers "1" to "29" for days and "1" to "11" for months. The position of the pointer 74 opposite the number "11" indicates that the cylinder has been rotated to indicate eleven days.

In operating the machine the first thing is the setting of the interest-knob 56. Suppose the rate at which interest is to be computed is six per cent., the principal at interest to be six thousand six hundred and seventy dollars, and the time eleven days and the interest-amount knob 56 and the amount-knobs 64, 64ª, and 64ᵇ to be at the bottom of the several slots in which they are adapted to slide, as shown in Fig. 2. First turn the interest-knob 56 to the left until the lower spur or pointer thereon points to the first or lowest number on the adjacent scale. Then shove the knob upward until the said spur or pointer is opposite the figure "6" and then rotate the knob a quarter round to the right until the upper spur or pointer is opposite "6." This indicates the rate per cent. By the first rotation of the knob to the left its crank-arm 58 (see Fig. 10) carries the lever-arm 60 to the left, and thereby rotates the vertical rock-shaft 54, so that its lever-arms 55 throw the gears 39 (see Fig. 14) to the left, so that the lugs on the hubs of the several gears engage or lock with the several master-gears 42, which form an attachment of each of the multiple cylinders A, B, and C. Then as the interest-knob is shoved up its rack 36 will effect rotation of the several rollers of the multiple cylinders A, B, and C, the cylinders as a whole remaining fixed in position. Thus the turning of the knob 56 to the left connects the rack or setting device with the main gear 42, so that all the rollers of the three cylinders may be rotated simultaneously when the rack is pushed up. The rotation of the knob 56 to the right or into the position shown in Fig. 1 will obviously shift several gears 39 to the right, and thereby release or unlock them all from the corresponding master-gears 42. The next step is to rotate the left-hand amount-knob 64$^b$ to the left until the lower spur thereon points to zero on the adjacent scale. Then shove the knob upward until the spur points to "6," which indicates "$6,000," this being the amount indicated by the first number of the given principal. Then turn the knob 64$^b$ to the right until the upper spur points to "6" and leave it in that position. The second amount-knob 64$^a$ is similarly operated to place it with reference to the numeral "6" on the right-hand scale, the number "6" in this case indicating "$600," which is the amount included in the principal upon which interest is to be computed. Similarly the third knob 64 is adjusted with reference to the number "7" on the adjacent scale, this number indicating "$70," which is also included in the principal. Thus care must be taken to always rotate the knobs to the left before shoving them upward and then to the right after the knob has been placed opposite the numeral standing for thousands, hundreds, or other amounts included in the principal. From the foregoing description it will be known that this adjustment of the knobs 64 64$^a$ 64$^b$ to the left and right throws the several lever-arms 66 in corresponding directions, so that through the rock-shafts 67 (see Figs. 11 and 12) the locking-rods 31 are adjusted to carry the gears 28, 29, and 30 to the left and to unlock the rod 31 from the sprocket-wheels 12, 13, and 14 on the other ends of the multiple-cylinder shafts. When the parts are thus adjusted, the raising of the knobs will rotate the multiple cylinders as a whole. The third and last step in the mechanical operation of the machine consists in rotating the crank 7 in the direction of the hands of a watch, so that the toothed cylinder 5 and the sprocket-wheel 10 on the shaft thereof are rotated in a direction of the arrow indicated in Fig. 3. The effect of this is to bring down a series of slides successively, beginning on the right and proceeding toward the left. The crank 7 is rotated until the pointer 74 on the dial 75 (see Fig. 1) is opposite the number "11," which stands for days. The several shutters 2$^a$, 3$^a$, and 4$^a$ of the three slots in the front of the casing will now be open, and through the openings in the slides pulled down (see Fig. 18, Sheet 2) may be read the numbers indicating interest for the desired time at the given rate on the numbers "6670." In the upper slot will appear "$11," which is the interest on six thousand dollars for eleven days at six per cent., and in the second slot will appear "$1.10," which is the interest on six hundred dollars at the given rate and time, and in the third slot will appear "12 5-6" cents, which is the interest on seventy dollars at the given rate and time. Adding these several amounts together, it will be found that twelve dollars and twenty-two cents is the aggregate interest on the entire principal at six per cent. for eleven days.

In further explanation of the machine and its operation it may be stated that the interest runs in a spiral line on the cylinders, or, in other words, interest at a given rate increasing day by day is indicated in a spiral line around each multiple cylinder, so while interest for one day always appears in the first right-hand space on a roller for two days it appears in the second space on the next or succeeding roller, the third day's interest on the third space of the next roller, the fourth day's interest on the fourth space of the next roller, and so on around the entire cylinder spirally until the full capacity of the cylinder is reached. For example, the interest of one hundred dollars for one day at five per cent. is one and seven-eighteenths cents, which amount appears in the first right-hand space of first roller. The interest for two days is two and seven-ninths cents, and it appears on next or second roller one space to the left. Again, interest on one hundred dollars for one day at seven per cent. is one and seventeen-eighteenths cents and for two days it is three and eight-ninths, which amount is seen on second roller one space to the left.

The device on rack for setting the amount simply rotates the several rollers of a cylinder individually to bring to the front or the opening in the casing the first day's interest on the amount. Then to obtain two days' interest it is obviously necessary to rotate the multiple cylinder as a whole so that the second roller may be brought to the front, and this is done by the crank 7 and the chain and sprocket mechanism 11 12 13 connected with it. The roller 5 is also rotated, and thus the second slide 16 is pulled down so the two days' interest appears through the opening. The three days' interest is obtained in the same way, the crank 7 being turned until the pointer 74 on the time-dial indicates the numeral "3," at which time the third slide from the right will have been pulled down and the cylinder have been rotated, so that the third roller from the starting-point will be at the opening, and the three days' interest may then be read through the opening in the third slide.

To recapitulate, the individual rollers of each cylinder are first rotated and set by rack 56 to indicate interest for one day for a given rate. Then the cylinders are rotated as a whole (the individual rollers remaining fixed on their axes) to bring to the front a particular roller showing amount of interest for a given time, &c. Thus if the interest is to be calculated on four hundred dollars the four-hundred-dollar roller is brought to the front, or opposite the opening in the casing. This is done by means of rack 36 (see Figs. 2 and 10) and gears 37 38 39. The next and final step in the operation is the rotation of the cylinder by crank 7, chain 11, and gears 12, 13, and 14 and the pulling down of the slides 16 successively until the required amount or amounts are visible at the front.

In order to restore the machine to its original condition, the crank 7 is rotated backward or in the opposite direction from the first rotation until the pointer 74 stands at 1, as indicated by dotted lines, Fig. 1, and the several amount-knobs are turned to the left a quarter-round and then shoved down to the position indicated in Fig. 2 and then turned again a quarter to the right. The interest-knob 56 is also similarly manipulated.

For convenience but three multiple cylinders and their attachments are illustrated in this case; but it is obvious that any other greater number may be employed, so that interest may be reckoned on any amount from one cent to one million dollars.

As shown in Figs. 2, 11, and 12, shutters 2ª, 3ª, and 4ª are provided for the respective slots 2, 3, and 4 of the casing 1. These are preferably constructed of thin sheet metal and attached to rock-shafts 76, located in the said slots and having arms 77 projecting rearward or within the casing.

As shown in Fig. 11, the three rock-shafts 76 are extended like shafts 25, 26, and 27 of the multiple cylinders different distances from the standard 9, and each is provided with a crank 79, to which a vertical rod 80 is connected. Thus, as shown in Fig. 11, there are three such rods, all arranged as shown in Fig. 12 and pivoted to a lever 81, fulcrumed on a lug at the bottom of casing 1. The three levers 81 are arranged under or in such relation to the amount-racks that the latter strike upon their rear ends as the racks descend, thus closing the shutters, as in Fig. 12.

A plate-spring 82 normally holds down the front end of each such rocking lever 81, so that the shutters are open and are held open whenever a rack is raised, this being necessary to enable the operator to view the slides and note the numbers that appear in the slots of such slides as may be pulled down by the toothed cylinder 5.

It will be perceived that if any one of the amount-knobs—say 64—is not raised the rack and shutter 2ª that correspond to and are connected with it will not be raised and opened, respectively. In brief, only the shutter or shutters are open through whose slot or slots interest is to appear. Thus confusion is obviously avoided in reading numbers indicating interest.

As shown in Figs. 4, 14, and 16, a plate-spring 83 is applied between the disks 53 of the several multiple cylinders and the several master-gears 42 applied to the same for the purpose of applying sufficient friction to the gears to prevent their rotation except when it is required to be effected in a positive manner. This spring is made in annular form, but provided with a lateral shank, which is riveted to the disk 53. Thus it stands normally in the position indicated in Fig. 16; but when the several gears 39 are shifted to the left to lock them with the master-gears 42 the spring is compressed or forced into the recess in the disks 53, as indicated in Fig. 14. As shown in Fig. 4, the outer side of the spring is roughened to increase its friction with the master-gears 42. The latter are held in place as to lateral movement by means of small brackets or keepers 84, which are attached to the disks 53.

What I claim is—

1. The improved machine for computing interest, comprising a series of rotatable multiple-roller cylinders, each roller thereof having inscribed on its periphery numerals indicating amounts of interest on sums varying from unity upward, the said numerals being arranged progressively on successive rollers, means for rotating the rollers individually, and means for rotating the cylinders as a whole, apertured slides arranged vertically in front of the several multiple cylinders, and means for normally supporting and for pulling down the said slides to bring their apertures into coincidence with numerals on individual rollers of the multiple cylinders, substantially as described.

2. In a machine for computing interest, comprising a series of multiple-roller cylinders, arranged horizontal and in the same vertical plane, each roller thereof having inscribed on its periphery numerals indicating amounts progressing from unity upward, means for rotating the rollers individually, and means for rotating the cylinders as a whole, a casing inclosing the cylinders and provided with a corresponding series of horizontal slots, a series of vertically-adjustable slides provided with openings arranged between the cylinders and the slotted front of the casing, and a rotatable cylinder provided with teeth adapted to successively engage the said slides, for drawing them down to bring their apertures in coincidence with the slots of the casing, substantially as described.

3. In a machine for computing interest, the combination of a series of rotatable multiple-roller cylinders each roller of which is inscribed with numerals indicating amounts of interest for different times and at different rates on sums progressing from unity upward, means for rotating the rollers individually while the cylinders remain fixed as a whole, means for rotating the multiple cylinders as a whole while the individual rollers thereof are held from rotation, for the purpose of setting the cylinders corresponding to the principal on which interest is to be reckoned, a casing provided with horizontal slots in its front portion, the same corresponding in number with the multiple cylinders and arranged directly opposite the axes of the cylinders, and means connected with the several cylinders for effecting further rotation of the same bodily, whereby they are adjusted to bring the amount or amounts indicating the desired interest to the front so that it or they may be read through the slot or slots of the casing, substantially as described.

4. In a machine for computing interest, the combination of a series of rotatable multiple-roller cylinders, each roller thereof having inscribed on its periphery numerals indicating amounts of interest on sums varying progressively from unity upward, means for rotating the individual rollers for indicating interest at different rates on the different sums with reference to which each roller is inscribed, means for rotating the cylinders as a whole for setting them corresponding to the principal upon which interest is to be reckoned, a series of vertically-movable slides provided with apertures corresponding in number to the several multiple cylinders, a cylinder or roller arranged below the multiple cylinders and provided with teeth arranged spirally thereon for engagement with the slides successively, and means connected with such roller, and the several multiple cylinders for rotating them all simultaneously, in order to bring to the front the numbers indicating amounts of interest on certain individual rollers, so that said numbers may be seen through the openings of the slide or slides that may be brought down, substantially as described.

5. In machine for computing interest, the combination with a multiple-roller cylinder comprising a series of rollers duly inscribed with numerals indicating amount of interest on different sums progressing from unity upward and according to different rates and time, each of said rollers being provided with a spur-gear, a master-gear arranged within such spur-gears and meshing therewith, means for imparting rotation to such master-gear for the purpose of rotating and setting the individual rollers to indicate interest at different rates for a given time, spur-gears mounted on the shafts of the respective multiple cylinders, and means connected therewith for rotating such gears for rotating the multiple cylinders as a whole for the purpose of setting said cylinders corresponding to the amount of the principal on which interest is to be reckoned, sprocket-wheels arranged on the opposite ends of the multiple-cylinder shafts, a sprocket-chain running thereon, and a driving sprocket-wheel by whose rotation the several cylinders may be rotated as a whole, for bringing to the front for inspection numerals on the rollers which indicate the required interest, substantially as described.

6. The combination with a multiple cylinder comprising a series of rollers arranged concentrically and having inscribed thereon numerals indicating amounts of interest on sums varying from unity upward for different times and at different rates, a shaft supporting such cylinder, a master-gear mounted concentrically thereon, and a series of spur gears or pinions fixed on the extended shafts of the several rollers and meshing with such master-gear, a spur-gear mounted slidably on the shaft of the cylinder and adapted to be locked with the master-gear, means for rotating such slidable gear to impart rotation to the master-gear and the pinions meshing therewith whereby the rollers may be rotated and set individually, corresponding to the interest, substantially as described.

7. The combination with a multiple-roller cylinder, comprising a series of concentric rollers each of which is inscribed with numerals indicating amounts of interest on amounts varying progressively from unity upward, a series of pinions fixed on the journals of the several rollers, a master-gear arranged concentrically with such pinions, and the shaft of the multiple cylinder, a spur-gear which is slidable on the cylinder-shaft and adapted to lock with the master-gear which is loose on said shaft, a vertical rack-bar which engages such slidable spur-gear, means for adjusting said rack vertically according to a scale indicating varying rates of interest, and means for shifting the slidable spur-gear for locking it with and releasing it from the master-gear, substantially as described.

8. The combination with a multiple-roller cylinder, comprising a series of concentric rollers, each inscribed with numerals indicating interest on sums varying progressively from unity upward and at different rates and times, pinions mounted fast on the journals of the several rollers, a master-gear which is concentric with said pinions and the shaft of the cylinder and adapted to mesh with the pinions, a spur-gear arranged slidably on the shaft of the cylinder and adapted to lock with the master-gear, a vertical rack-bar engaging the several slidable spur-gear, a device for adjusting the rack-bar vertically according to the rate at which interest is to be computed, a rock-shaft arranged vertically and provided with a lever-arm engaging the slidable gear, and means for rotating the said shaft as required to lock the slidable gear with and release it from the master-gear, substantially as described.

9. The combination with rotatable multiple-roller cylinders, each comprising a series of rotatable rollers arranged concentrically and having inscribed on their peripheries numerals indicating amounts of interest on sums varying progressively from unity upward, a series of pinions fixed on the journals of the several rollers, a master-gear meshing with the several pinions and arranged concentrically on the shaft of the multiple cylinder, a slidable gear adapted to lock with such master-gear for imparting rotation to all the rollers simultaneously, a vertical rack-bar engaging the series of slidable gears, a vertical rock-shaft having lever-arms loosely connected with the several slidable spur-gears, and a lower lever-arm also fixed on the said rock-shaft, and a vertically-slidable knob connected with the said rack and having a crank portion adapted to engage with the lower lever-arm of the rock-shaft, whereby the rotation of said knob effects the shifting of the slidable spur-gears with reference to the master-gear and its vertical adjustment effects the rotation of the several rollers of the multiple cylinders, as required to correspond with the different rates of interest, substantially as described.

10. The combination with multiple-roller cylinders, each comprising a series of rollers arranged concentrically and having inscribed thereon numerals indicating amounts of interest on sums varying from unity upward and at different rates, means for rotating and adjusting such rollers individually, according to the rate at which interest is to be computed, spur-gears mounted on the shafts of the multiple cylinders, a series of vertical rack-bars engaging such spur-gears, the said racks being adjustable vertically as required to rotate the multiple cylinders corresponding to the amount of the principal on which interest is to be reckoned, a vertical rock-shaft having a series of arms corresponding to the several spur-gears, locking devices applied to each spur-gear and connected with the arms of the rock-shaft, and a device for rotating the latter as required to lock and release the spur-gears substantially as described.

11. The combination with a series of multiple cylinders, each comprising rollers arranged concentrically and having inscribed thereon numerals indicating amounts of interest on sums progressing from unity upward at different rates, means for adjusting the rollers individually corresponding to a particular rate of interest, spur-gears mounted on the shafts of the multiple cylinders, movable devices adapted to engage the said gears for alternately locking them with the multiple cylinders and releasing them therefrom, vertical racks corresponding in number with the several cylinders, and adapted to engage the respective spur-gears, a vertical rock-shaft having a series of arms adapted to engage with the locking devices of the several spur-gears, a lower lever-arm fixed on such rock-shaft and having a vertical slot in its free end, vertically-slidable devices permanently attached to the lever-arms of the several racks, and also adapted to engage the lower lever-arms of the rock-shaft for shifting the same right and left, whereby the racks may be adjusted vertically according to the amounts of the principal in millions, thousands, hundreds, &c., and the rock-shaft may be rotated for locking and releasing the spur-gears preparatory to and following the operation of the racks, substantially as described.

12. The combination with a series of multiple cylinders, each comprising a series of rollers arranged concentrically and inscribed on their peripheries with numerals indicating amounts of interest on sums varying from unity upward and at different rates for different times, hollow rotatable shafts upon which the cylinders proper are fixed and supported, means for rotating the rollers of the several cylinders individually corresponding to a particular rate of interest, means arranged at one end of the several cylinders for rotating them as a whole according to the amount of the principal on which interest is to be computed, means arranged at the opposite ends of the cylinders for rotating them as a whole corresponding to the time for which interest is to be computed, and a locking device extending through the hollow shafts of the several cylinders and adapted to lock and release alternately the rotative means arranged at the opposite ends of the cylinders, substantially as described.

13. The combination with a series of rotatable multiple cylinders each comprising a series of rollers arranged concentrically and inscribed with means indicating interest on sums varying progressively from unity upward and at different rates, means for rotating and setting the individual rollers according to a particular rate of interest, hollow shafts whereon the multiple cylinders proper are mounted and fixed, spur-gears mounted on said hollow shafts at one end of the cylinders, racks engaging the same for rotating the gears, sprocket-wheels arranged on the opposite ends of the cylinder-shafts, and means engaging the same for rotating them, a rod arranged slidably in the hollow shaft, and provided with lugs at its ends which are adapted to alternately engage with and disengage from the said spur-gears and their sprocket-wheels, whereby the spur-gears are locked when the sprocket-wheels are released and vice versa, substantially as described.

14. The combination with a series of multiple cylinders, each comprising nine rollers arranged concentrically and having inscribed thereon numerals indicating amounts of interest on sums varying progressively from unity upward and at different rates for different times, means for rotating and adjusting the individual rollers corresponding to a particular rate of interest, means for rotating the cylinders as a whole corresponding to the amount of the principal on which interest is to be computed, means arranged at the opposite ends of said cylinders for rotating them as a whole, corresponding to the time at which interest is to be computed, and a movable indicator connected with such means and actuated thereby for indicating on a dial the time for which interest is to be computed, substantially as described.

15. The combination with a series of multiple-roller cylinders, each comprising a series of nine rollers arranged concentrically and inscribed on their peripheries with numerals indicating amounts of interest on sums varying progressively from unity upward, at different rates and for different times, means for adjusting the rollers individually according to a particular rate of interest, means for adjusting the multiple cylinders as a whole corresponding to the amount of the principal on which interest is to be computed, a series of vertically-adjustable slides arranged in front of the several multiple cylinders and provided with apertures corresponding in number with the cylinders, a rotatable roller arranged below the several cylinders and provided with teeth arranged spirally and adapted for engagement with the several slides, means arranged at the opposite ends of the cylinders for rotating them simultaneously according to the time for which interest is to be computed on the entire principal, such means being connected with the toothed cylinder, a casing provided with a scale indicating days and months, an index or pointer adapted to rotate over said scale, and means connecting it operatively with the toothed cylinder whereby it moves in unison with the latter, substantially as described.

16. The combination with a series of multiple cylinders comprising rotatable rollers arranged concentrically and inscribed as set forth, of gears operatively connected with the several rollers for rotating the latter, the rack-bar adapted to engage the several gears, means for shifting the gears for engaging them with and disengaging them from the rollers, a knob provided with radial spurs set ninety degrees apart, and connected with the aforesaid rack, and means for shifting the spur-gears, the said spurs serving as means to indicate engagement or disengagement of the gears, substantially as described.

17. The combination with a casing having a slot in its front portion, of a multiple cylinder comprising a series of concentric rollers each inscribed with numerals indicating amounts of interest on sums varying progressively from unity upward, at different times, and at different rates, a vertically-movable slide arranged between such cylinder and the casing and provided with an aperture, and means for adjusting the said slide and cylinder to bring the front of one of the rollers in coincidence with the slots of the slide and casing, substantially as described.

18. The combination with a multiple cylinder, comprising a series of concentric rollers each inscribed with numerals indicating interest on different sums, for different times at different rates, of a series of slides arranged vertically and provided with apertures, levers with which said slides are connected, means for normally supporting the slides but permitting them to yield to be drawn downward, a rotatable cylinder arranged below said levers and provided with teeth arranged spirally, and catches pivoted to the levers and adapted for adjustable engagement with the teeth of the cylinder, substantially as described.

19. The combination, with a series of multiple cylinders, having their axes arranged horizontal in the same vertical plane and each comprising rollers having inscribed on their peripheries numerals indicating amounts of interest on different sums, at different rates, for different times, of means for rotating the rollers individually according to a particular rate of interest, a casing inclosing said cylinders and provided in its face with horizontal slots corresponding in number to the cylinders and arranged in the same horizontal plane with the axes of the cylinders, means for rotating the cylinders as a whole according to the principal on which interest is to be computed and also according to the time for which interest runs, a series of vertical slides arranged between the cylinders and the front of the casing and provided with apertures, means for elastically supporting the several slides, a cylinder arranged below the multiple cylinders and provided with teeth arranged spirally, devices connected with the slides and having catches adapted to engage the teeth of the lower cylinder, and a stop which such devices engage when released from the cylinder, substantially as described.

20. The combination, with rotatable cylinders having rollers inscribed as specified, and means for rotating the rollers individually and the cylinders as a whole corresponding to the rate of interest, the amount of the principal, and the time for which interest is computed, of a toothed cylinder arranged below the multiple cylinders, apertured slides arranged between the multiple cylinders and the front of the casing, levers with which the slides are pivotally connected, catches pivoted to the free ends of the levers and adapted to engage the teeth of the lower cylinder, springs pressing upon said catches for holding them in position to engage the teeth, the said catches being provided on their inner sides with swells or shoulders, which, when the levers and slides are drawn down, strike upon the periphery of the toothed cylinder and disengage the catches from the teeth, substantially as described.

21. The combination, with a casing having its front slotted, of a series of multiple-roller cylinders, having their component rollers inscribed as and for the purpose specified, means for adjusting the said cylinders and their individual rollers corresponding to the amount of the principal, the rate of interest, and the time for which the latter is computed, a series of apertured slides arranged between the multiple cylinders and the front of the casing, the slides being constructed with parallel vertical flanges on their front sides, and the casing provided with vertical grooves adapted to receive such flanges, and means for drawing down the slides successively, substantially as described.

22. The combination, with a casing having its front slotted, of a series of rotatable multiple-roller cylinders, having their individual rollers inscribed as set forth, means for adjusting the individual rollers and the cylinders as a whole corresponding to the rate of interest, the amount of the principal, and the time for which interest is to be computed, a series of vertical apertured slides arranged between the multiple cylinders and the front of the casing, means for drawing down the several slides successively, spiral springs connected with the upper ends of the slides and with a fixed portion of the casing, whereby the slides are normally supported elastically, substantially as described.

23. The combination, with the multiple-roller cylinders, comprising a series of concentric rollers, parallel disks in which they are journaled, each roller being inscribed with numerals indicating amounts of interest on sums varying progressively from unity upward, at different rates for different times, of pinions fixed on the journals of such rollers, a master-gear arranged concentrically within the circle of pinions and meshing therewith, spur-gears mounted slidable on the shafts of the multiple cylinders and adapted to engage the master-gears which are rotatable on the hubs of said spur-gears, means for actuating the latter both slidably and rotatably, and springs interposed between the master-gears and the adjacent disks, the same serving to hold the master-gears by friction when the spur-gears are released therefrom, substantially as described.

24. The combination, with a casing provided with horizontal slots in its front, of a corresponding series of shutters pivoted at the several slots, means for adjusting the said shutters for opening and closing them, multiple-roller cylinders arranged in the casing directly opposite the several slots of the latter, means for rotating the cylinders bodily according to the amounts of the principal on which interest is to be computed, a device connected with the shutters and operatively connected with the means for rotating the multiple cylinders whereby the shutters are opened or closed, substantially as described.

25. The combination, with a casing having its front provided with horizontal slots, of a series of corresponding shutters adapted to close or open said slots, rods connected with lever-arms of the shutters and extending downward, a spring connected with said rods and tending to pull the same downward for holding the shutters normally open, multiple-roller cylinders arranged in the casing, opposite the several slots in the latter, spur-gears operatively connected with the multiple cylinders for rotating them as a whole, racks arranged vertically and slidably and engaging the several spur-gears, and levers pivoted at the bottom of the casing connected with the rods that operate the shutters, and located in such relation to the several racks that they are pivoted for closing the shutters when a rack is at the lowest position, substantially as described.

26. The improved interest-computing machine comprising a casing having a series of horizontal slots in its face, a series of multiple-roller cylinders arranged horizontal therein and in the same vertical plane, each cylinder consisting of nine rollers which are severally inscribed on their peripheries with numerals indicating amounts of interest on sums varying progressing from unity upward, at different rates, and for different times, means for adjusting the several rollers of each cylinder corresponding to a particular rate of interest, other means for rotating the cylinders as a whole corresponding to the principal on which interest is to be computed, pivoted shutters for opening and closing the slots of the casing, a series of rods connected with the several shutters, the shutter-rods being operatively connected with the means for operating the cylinders, and devices for adjusting the means by which the cylinders are rotated.

CHARLES ABLE MARBLE.

Witnesses:
GEORGE C. WILLIS,
L. H. W. DOBBINS.